July 1, 1969
H. W. RIKE
3,452,607
CENTRIFUGAL ACTUATOR
Filed June 17, 1966
Sheet 1 of 2
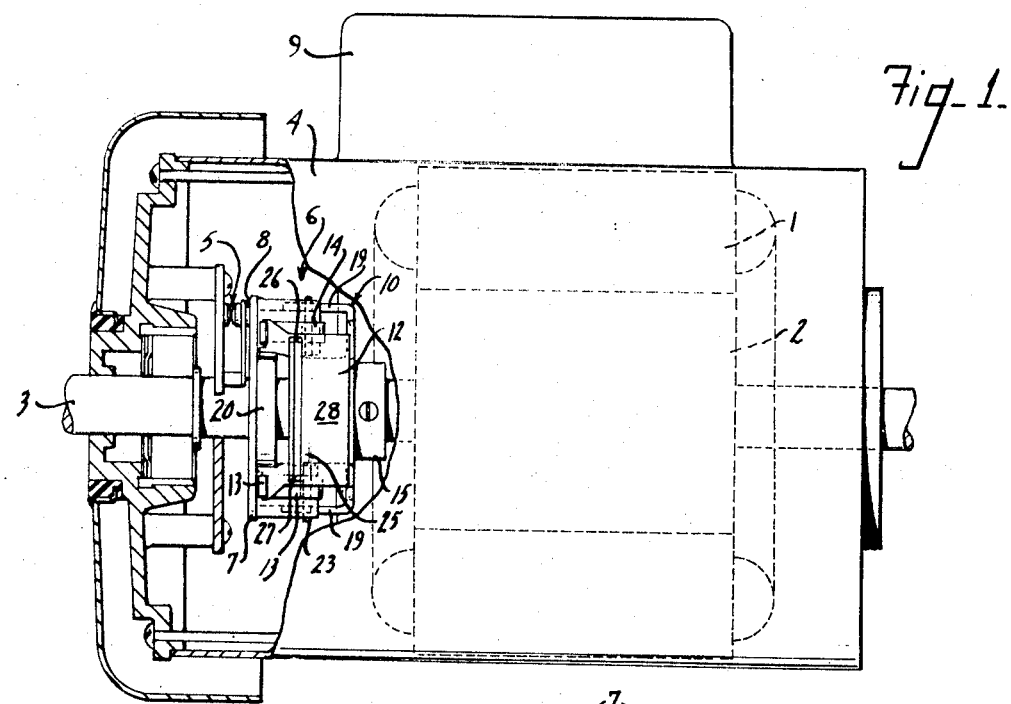
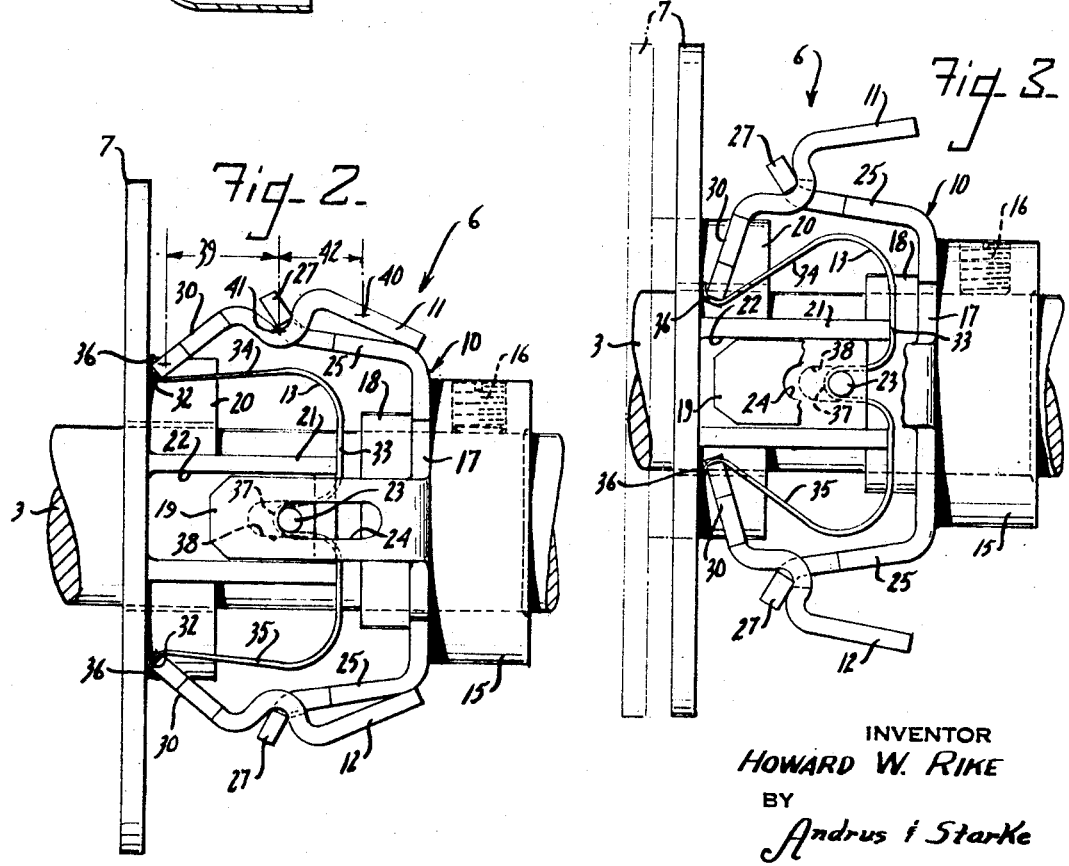
INVENTOR
HOWARD W. RIKE
BY
Andrus & Starke
Attorneys

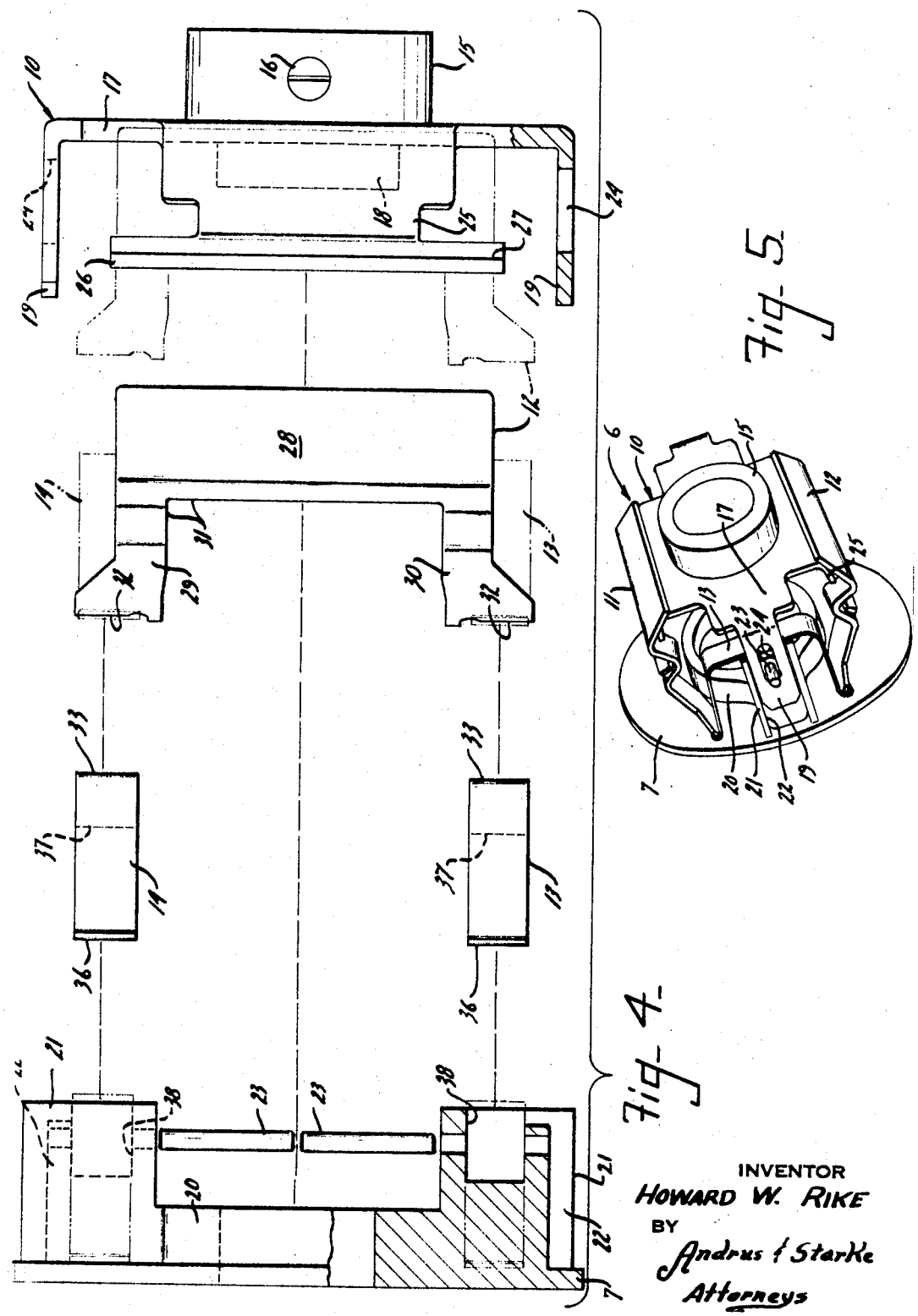

United States Patent Office 3,452,607
Patented July 1, 1969

3,452,607
CENTRIFUGAL ACTUATOR
Howard W. Rike, Kettering, Ohio, assignor to A. O. Smith Corporation, Milwaukee, Wis., a corporation of New York
Filed June 17, 1966, Ser. No. 558,304
Int. Cl. G01p *15/08*
U.S. Cl. 73—538                                         12 Claims

ABSTRACT OF THE DISCLOSURE

This disclosure relates to a snap-acting centrifugal actuator having a support member connected to a rotating shaft. Weight members are pivotally mounted to opposite sides on a knife edge for pivotal movement about an axis perpendicular to the rotational axis.

A spool member is slidably mounted on a shaft. A pair of flat leaf spring members having a U-shaped cross section are provided to opposite sides of this actuator and each has the outer ends coupled to the ends of the two weights and the central portion connected to the spool. The weight members and spring cooperate to establish a snap-action movement of the actuator.

---

This invention relates to a centrifugal actuator particularly for switch mechanisms and particularly to a spring loaded switch actuator for motor switches and responsive to centrifugal forces established by a rotating motor shaft to overcome the spring forces.

Switches of a centrifugal force variety have a wide variety of applications. A particularly well developed and important field is the use of a centrifugally actuated switch for controlling a split phase or condenser start, single phase alternating current motor. In such motors, a starting branch circuit is interconnected to develop the desired starting torque. When the motor reaches a selected operating speed, the auxiliary starting branch circuit is preferably automatically cut out through a suitable switching mechanism. Centrifugal switches responsive to the desired speed have been widely employed for this purpose.

Functionally such switches should provide a very positive and rapid switching action at a very closely regulated or predetermined speed and should operate at the same speed during each starting operation. Further, as a practical matter in view of the high state of development of the art and the competitive nature of the product, the switching device must be economical to manufacture while providing a high degree of reliability, repeatability and long life.

A highly satisfactory spool type starting switch assembly is shown in U.S. Patent 2,991,340 to A. S. Bickham. As disclosed in this patent, the switch mechanism is fixed to a motor housing and a spool is slidably mounted on the shaft for operating of the switch contacts. A pair of pivotally mounted weights is secured to the actuator or spool proper and spring biased to a predetermined position. During the starting of the motor, the spring force holds the weights retracted and the spool in a retracted position whereupon the contacts are in a normally closed position to insert the starting circuit into the motor circuit. However, as the motor reaches operating speed, the weights pivot outwardly and effect a snap acting movement of the spool to open the switch contacts and thereby remove the starting circuit branch from the motor circuit.

The present invention is particularly directed to a simplified actuator assembly employing a minimum number of readily produced parts which can be readily assembled and thereby providing a very economical switch actuator. However, the actuator maintains reliable and repeatable switch operations at a predetermined speed over long periods of time.

Generally, in accordance with the present invention, a support member is provided to be releasably or otherwise connected to a rotating shaft or the like for simultaneous rotation therewith. Axially extending arm supports are carried by the member on opposite sides of the rotational axis. The supports are provided with similar pivot edges and weight members are pivotally mounted to each for pivotal movement about an axis perpendicular to the rotational axis. The weight members extend to opposite sides of the pivot edge with a heavier portion to the one side.

A spool member is mounted concentrically with the support plate or member and includes an opening generally somewhat larger than the shaft to which the mechanism is attached. The spool is slidably coupled to the mounting plate. A pair of flat leaf spring members is provided having a portion thereof coupled to the lighter ends of the two weights and the central or base portion connected to the spool.

In the preferred construction, the flat leaf spring serves the three functions of supporting the spool so it need not ride on the shaft, controls the switching speed as a result of its spring strength or constant and forms the linkage or connection between the spool and the weights for moving the spool axially when the predetermined speed is obtained.

In the normal position, the weights are biased to a standby position with the spring legs expanded generally outwardly from the axis of the mechanism. Generally, centrifugal forces at the switching speed pivot the weight members to force the spring ends inwardly and exert an axial moving force on the attached spool.

In operation, the centrifugal force on the plate member urges the heavier ends outwardly and therefore the lighter or spring attached ends inwardly. The springs produce a counter or balancing moment. However, as the weight moves outwardly its moment increases at a more rapid rate than the counter moment of the spring even though the compression of the spring increases the spring force because of a decrease in the moment arm of the spring and an increase of the moment arm of the weight. The net operating moment is in the proper direction such that at a very slight increase in rotational speed above the balance position the weight snaps rapidly to an outer position compressing the spring and causing the actuator to move axially.

The centrifugal switch actuator of the present invention provides a highly practical device in that it employs a relatively small number of readily reproduced components which may be assembled in a very simple and inexpensive manner. It has been found that the axial movement of the spool as a result of the present invention is positive and rapid and at a highly repeatable speed.

The drawings furnished herewith illustrate a preferred construction of the present invention in which the above advantages and features are clearly illustrated as well as others which will be clear from the following description.

In the drawings:

FIG. 1 is a side elevational view of an electric motor with parts broken away to show the centrifugal switch construction in accordance with the present invention;

FIG. 2 is an enlarged side elevational view of the switch actuator particularly forming the subject matter of the present invention;

FIG. 3 is a pictorial view of the switch actuator in the actuated position;

FIG. 4 is an exploded view of the switch actuator; and

FIG. 5 is a pictorial view of the actuator shown in FIGS. 1–4.

Referring to the drawings and particularly to FIG. 1, an electric motor is shown of a condenser start, single phase variety including an annular stator 1 within which a rotor 2 is rotatably mounted on a shaft 3. The stator is fixed within an outer housing 4 which is closed in the usual manner at the opposite ends by end bells having bearings for supporting the shaft 3. Switch contacts 5 are secured to the one end closure member of housing 4 and are adapted to be actuated by a centrifugal actuator 6 particularly forming the subject matter of the present invention. Generally, the actuator 6 includes a spool 7 which is adapted to be moved axially in response to a selected speed of the motor 1. A switch button 8 is connected to one of the switch contacts 5 and rides on the face of the spool 7. The switch 5 is held closed by the spool 7 with the shaft 3 stationary and connects a starting condenser 9 in a start circuit, not shown. Condenser 9 is shown mounted to the outer surface of the motor housing 4 in accordance with common practice.

As the circuit may be of any well known variety, a specific circuit is not shown in the drawings. When the stator circuit is energized, the rotor 2 and attached shaft 3 start to rotate. The centrifugal force acting on actuator 6 is insufficient to cause movement of the spool 7 until a selected speed is reached. When that speed is reached however the spool 7 is moved axially inwardly to open the switch contacts 5 and disconnect the circuit of condenser 9 to establish the circuit for running.

Referring particularly to FIGS. 2–4, a preferred construction of the actuator 6 in accordance with the present invention is more clearly shown. Generally, the actuator 6 includes a support member 10 connected to shaft 3 with the spool 7 slidably coupled thereto. Weights 11 and 12 are pivotally mounted to the member 10 on opposite sides of the shaft 3 and biased to an initial position by a pair of U-shaped springs 13 and 14 which also serve to interconnect the spool 7 to member 10 and to the weights 11 and 12, as more fully developed hereinafter.

More particularly, the support member 10 includes a hub 15 secured to the shaft 3 by a set screw 16 or the like. A rectangular base portion 17 is secured to hub 15 and includes a central opening through which the shaft 3 projects. The opening is struck out to form an oppositely projecting hub 18.

Small guide arms 19 extend integrally from the narrow or short edges of the plate 17 parallel to the axis of the shaft 3 and on the opposite sides of the shaft toward spool 7.

The spool 7 is annular shaped and includes a central hub 20 having an opening somewhat larger than the shaft. Integral guide members 21 are formed on the backside of the spool and have recesses generally corresponding to the width of the guide arms 19. The mounting plate 10 and spool 7 are assembled with the arms 19 slidably disposed in the corresponding recesses 22 of the guide members. Small locking pins 23 project through a slot 24 in each of the arms 19 and is embedded within openings in the guide members 21 to slidably lock the spool 7 to the mounting member 10.

Weight support arm portions 25 project axially from the long edge of the base portion 17 of member 10 on the opposite sides of the shaft 3. Each of the arm portions 25 is a similar T-shaped member terminating in a pair of similar oppositely extending lips 26 and 27 projecting laterally from opposite side edges of the stem portion. The edges of the lips 26 and 27 define pivotal edges for the weights 11 and 12. The knife edge portions or lips 26 and 27 are bent outwardly as shown in FIGS. 2 and 3 to locate the knife edge surfaces at an angle with respect to the rotating axis of shaft 3.

Each of the weights 11 and 12 includes a plate-like portion 28 integrally formed with serpentine leg portions 29 and 30 which are pivotally disposed upon the edges of the lips 26 and 27. The plate-like portion 28 is adjacent the arm 25. The leg portions have a central U-shaped configuration 31 mating with the pivot edges and with the outer plate portion and leg portions bent backwardly in the same direction such that the weights generally have an M-shaped cross section as shown in FIGS. 2 and 3. The outer ends of the leg portions 29 and 30 are recessed as at 32 to mesh with the ends of the springs 13 and 14.

In accordance with the present invention, the weights are held to the respective four knife edges by the pair of U-shaped springs 13 and 14 as follows.

Referring particularly to FIGS. 3 and 4, the springs 13 and 14 are generally U-shaped spring members having a central web or base 33 and parallel outer spring arms 34 and 35 terminating in integral outwardly opening hook members 36. The springs 13 and 14 are disposed between the arm portions of the mounting member 10 with the spring arms 34 and 35 extending outwardly. The hook portions 36 respectively engage the adjacent aligned ends of the legs 29 and 30 of the weights 11 and 12. The spring arms 34 and 35 are stressed to extend or project outwardly from each other and are held generally parallel to the rotational axis of the shaft 3 by the weights 11 and 12 in the stopped condition of shaft 3. Thus, with the spring arms 34 and 35 parallel to shaft 3, the weights 11 and 12 are pivoted to resiliently hold the outer plate-like portions 28 engaging the stem portion of the arms 25. The center of each spring base 33 is offset to define a U-shaped portion 37 looped about the pins 23 which are secured to the guides 22. In the illustrated embodiment of the invention, the guides are relatively heavy abutments having a recess 38 within which the U-shaped portion of the spring is held. The pin 23 passes through openings in the wall defined in the spring recesses.

Further, the length of the spring arms 34 and 35 are selected to correspond to the forward positioning of the spool 7 and bear on the backside of the spool 7 to hold it in the extended position shown in FIG. 2. The hook portion 36 of each arm is preferably a smooth curve to provide sliding engagement with the back side of the spool 7.

Referring particularly to FIG. 2, the forces and the moment arms acting on the weight 11 are shown for purposes of more fully explaining the operation of the illustrated actuator. In the motor stopped position, the U-shaped spring 13 establishes a pivotal force with moment arm 39 and holds the weight 11 with the heavy plate-like portion 28 pivoted inwardly into engagement with the mounting member 10. The center of gravity 40 of the plate portion 28 is shown generally centrally of the length thereof and located outwardly slightly beyond the pivot connection 41 of the U-shaped configuration 31 of weight 11 and the pivot lip 27. Further, the moment arm 42 of the weight 11 with respect to the pivot connection is somewhat less than the moment arm of the spring 13.

The U-shaped springs 13 and 14 thus hold the weights 11 and 12 in the standby position shown and through the connecting pin 23 hold the spool 7 in the expanded or outward position such that the motor contacts 5 are held closed. When the power is supplied to the motor, the rotor 2 and attached shaft 3 begin to rotate. The attached actuator 6 rotates correspondingly. The moment of the centrifugal force which is the centrifugal force at the center of gravity 40 times its perpendicular distance to the pivot connection 41 is opposed by the counter or opposite moment produced by the spring 13 which is equal to the spring force acting through its moment arm or distance to the pivot connection 41. These forces are perpendicular to the center line of the actuator 6 and shaft 3 and on opposite sides of the pivot connection 41 and thus tend to balance each other.

As the motor reaches switching speed, the force on the weight tends to move plate-like portion 28 outwardly about the pivot connection. As the weight moves outwardly, its moment arm increases and its moment increases faster than the moment due to the spring 13. The spring force does increase due to the compression of the spring arm 34 by the pivoting weight. However, the pivotal movement of the spring arm decreases its moment arm 39.

The system is such that a net moment is created in the counterclockwise direction as viewed in FIG. 2 with respect to weight 11. Consequently, once the weight starts to pivot a very slight increase in speed causes a rapid snap action movement of the weight to the position of FIG. 3 and opening of the contacts 5.

When the motor shaft 3 slows down the centrifugal force decreases and at a selected speed the spring force is sufficiently great to reset the actuator 6 to the standby position of FIG. 2.

The U-shaped leaf springs 13 and 14 are anchored to the spool and coupled to the mounting member to firmly support the spool 7. This eliminates the necessity of having the spool ride on the motor shaft 3 or to be otherwise supported to establish stability, as in many actuators. The strength of the spring also contributes to the switching speed. As a third function, the spring constitutes the linkage between the weight and the spool for transmitting the axial motion of a part of the weight directly to the spool for the axial positioning thereof.

The actuator of the present invention uses relatively few components, all of which are simple in design and can be economically produced and assembled. The axial motion of the spool is positive and rapid at a selected switching speed.

Various modes of carrying out the invention are contemplated as being within the scope of the following claims particularly pointing out and distinctly claiming the subject matter which is regarded as the invention.

I claim:

1. A centrifugal actuator for producing snap-action axial movement in response to selected rotational speed of a rotatable member, comprising
    a mounting member for securement to a rotatable member,
    a weight pivotally connected by a pivot connection to the mounting member and extending therefrom with the center of gravity spaced axially of the rotatable member from the pivot connection, said weight pivoting in response to centrifugal force created by the selected rotation of said rotatable member in the direction to move the center of gravity axially outwardly of the pivot connection to increase the moment arm of the weight,
    an actuating member, and
    a spring member having a leaf spring arm extending generally parallel to the rotational axis and having one portion of the spring arm secured to the actuating member and a spaced portion secured to the weight, said spring biasing the weight in the direction opposite that of the centrifugal force and deflected by pivoting of the weight as a result of the centrifugal force at a selected rotational speed, the portion of the spring secured to the weight moving toward the point of connection between the spring and the actuating member, whereby the moment due to the spring decreases relative to the increasing moment of the weight to establish rapid movement of the actuating member between a first position and a second position.

2. The centrifugal actuator of claim 1 wherein the leaf spring arm constitutes the sole support of the actuating member.

3. The centrifugal actuator of claim 2 where the leaf spring arm constitutes the linkage between the actuating member and the weight to axially position the actuating member.

4. The centrifugal acuator of claim 1 wherein the mounting member is constructed to project diametrically of the rotatable member and including a second weight pivotally secured to the mounting member on the diametrically opposite side of the mounting member from the first weight, said spring member is a U-shaped member having a pair of leaf spring arms joined to a base, the outer ends of which are secured to the weights and the base is connected to the actuating member.

5. The centrifugal actuator of claim 4 wherein each of said weights is a generally U-shaped unit having a plate-like weight portion and a pair of legs, said weights being pivotally mounted in generally parallel planes to opposite sides of the mounting member, said first spring member being disposed to one side of the mounting member and being U-shaped with leaf spring arms engaging with first corresponding legs of the weights, and a second similar spring member being disposed to the opposite side of the mounting member with the leaf spring arms engaging the second corresponding legs of the weights.

6. The centrifugal actuator of claim 5 wherein each of the spring members has the base formed with an offset loop portion extending between the leaf spring arms, and a pin means secured to the actuating member and extended into the loop portion.

7. A centrifugal operator for actuation in response to rotation of a rotatable shaft, comprising
    an element having means for attachment to a rotatable shaft and having pivot means on opposite sides of the shaft,
    a pair of weights pivotally mounted one each on the pivot means, and said weights each extending generally parallel to the axis of the shaft and having axially spaced portions on opposite sides of the pivot means with the center of gravity spaced to one side of the pivot means,
    a U-shaped spring means having a base with resilient leaf spring arms projecting from the base,
    means securing the ends of the spring arms to the corresponding portions of the weights to the side of the pivot means opposite from the center of gravity of the weights, said spring arms urging the weights to pivot about the pivot means against centrifugal force acting upon the weights,
    said weights pivoting with the portion including the center of gravity moving outwardly and the portion connected to the spring means moving inwardly to establish an increasing moment for the weights relative to the moment of the spring means at a selected rotational speed to produce a snap-action movement of the weights and the ends of the spring arms, and
    an actuating member having means secured to the spring arms and movable with the spring arms.

8. The centrifugal operator of claim 7 wherein
    said element includes a collar means for attachment to the rotatable shaft and having a pair of axially extending support arms on opposite sides of the collar means, each of said arms including pivot members on opposite sides thereof.
    said weights each including a pair of legs spaced in accordance with the pivot edges of one of said arms and being pivotally mounted at an intermediate point on the legs to the pivot members, and
    the ends of the spring arms being connected to the ends of the legs.

9. The centrifugal operator of claim 8 wherein
    said element includes a pair of guide arms on opposite sides of the collar means between said support arms, said guide arms each including an elongated axial opening,
    said actuating member including a ring portion having an internal diameter greater than the collar means and having abutments on the back side of the ring portion, each of said guide arms being disposed adjacent one side of the abutments, pin means secured to the abutment and passing through said axial opening of the adjacent guide arms, and said spring members each including a loop portion in the base, said loop portion projecting between the spring arms and passing about the pin means, said spring members constituting the sole support for the actuating and the linkage of the actuating member to the weights.

10. The centrifugal operator of claim 7 wherein said element includes a collar member having means to fix the elements to the shaft and a pair of parallel guide arms projecting axially of the collar member and a pair of generally parallel pivot arms projecting axially of the collar member between the parallel guide arms, said pivot arms including, on their outermost ends, laterally extending lips and said guide arms having axially extended guide slots, each of said pair of weights including a plate-like portion having projecting legs on the opposite edges, said weights being assembled one each with said pivot arms with the legs engaging the inner edge of the pivot arms and the plate-like portion engaging the outer surface of the corresponding pivot arm, the legs projecting radially inwardly of the center of gravity of the corresponding weight, said actuating member constituting a spool having an internal opening larger than said collar member to define a gap between the spool and the shaft, said spool having a pair of abutments on the back side to opposite sides of the opening with the outer surfaces of the spool spaced to fit between the guide arms of said element, each of said abutments being centrally recessed and aligned with one of said spring means, said U-shaped spring means having the base formed with an inwardly projecting loop between the spring arms, said loop being located with the recess of the aligned abutments, a pair of pins secured one to each of the abutments and passing through the corresponding loop of the aligned spring and the guide slot in the guide arm, and the outer ends of each spring arm being partially bent outwardly to form a hook engaging the outermost end of a leg of the weights and engaging the back side of the spool to urge the spool outwardly of the element.

11. The centrifugal operator of claim 10 wherein the legs of each weight is similarly bent to define a U-shaped portion aligned with the pivot arm and with the outerportion of the leg and the plate-like portion bent rearwardly to define a generally M-shaped cross section.

12. The centrifugal operator of claim 11 wherein the weights have the center gravity located within an intermediate point of the plate-like portion and outwardly of the pivot arm and the outer ends of the legs are disposed inwardly of the pivot arms whereby the moment arm of the weight increases and the moment arm of the spring decreases as the weight pivots under the action of centrifugal force.

References Cited
UNITED STATES PATENTS

| | | | |
|---|---|---|---|
| 131,282 | 9/1872 | Lamont | 73—546 |
| 356,147 | 1/1887 | McKinley | 73—546 |
| 356,644 | 1/1887 | Hugon | 73—546 |
| 399,653 | 3/1889 | Castle | 73—546 |
| 1,747,310 | 2/1930 | Mayer | 200—80 |
| 1,912,668 | 6/1933 | Sylvander et al. | 73—546 |
| 2,991,340 | 7/1961 | Bickham | 200—80 |
| 3,044,308 | 7/1962 | Ensinger | 73—546 |

JAMES J. GILL, *Primary Examiner.*

ROBERT S. SALZMAN, *Assistant Examiner.*

U.S. Cl. X.R.

73—546